United States Patent [19]

Andersson

[11] Patent Number: 5,118,275
[45] Date of Patent: Jun. 2, 1992

[54] APPARATUS FOR PRODUCING AN ELONGATED FIBROUS OBJECT

[76] Inventor: Kurt Andersson, Torsbovägen 13, 641 96, Katrineholm, Sweden

[21] Appl. No.: 469,536
[22] PCT Filed: Sep. 15, 1988
[86] PCT No.: PCT/SE88/00481
§ 371 Date: Mar. 19, 1990
§ 102(e) Date: Mar. 19, 1990
[87] PCT Pub. No.: WO89/02354
PCT Pub. Date: Mar. 23, 1989

[30] Foreign Application Priority Data

Sep. 17, 1987 [SE] Sweden .................. 8703603

[51] Int. Cl.⁵ ............... B29C 35/14; B29C 43/52
[52] U.S. Cl. ............... 425/174.8 R; 219/10.81; 264/25; 425/233; 425/407
[58] Field of Search ............... 264/22, 25, 26, 24; 425/174, 174.8 R, 174.8 F, 547, 550, 553, 233, 235, 292, 407; 219/10.81; 156/380.6, 380.8

[56] References Cited

U.S. PATENT DOCUMENTS 3,791,906  2/1974  Farkas ...................... 264/26
3,874,207  4/1975  Lemelson ................. 425/174.8
4,242,687  12/1980  Bahl ........................ 346/75
4,244,894  1/1981  Segransan et al. ...... 425/174.8 E
4,352,709  10/1982  Urai et al. ............... 219/10.81
4,427,865  1/1984  Watanabe ................. 219/10.81
4,548,772  10/1985  Kawatnata ............... 425/174.8
4,577,077  3/1986  Kawamata ............... 219/10.81
4,673,345  6/1987  Andersson ............... 425/174.8
4,801,778  1/1989  Mizutari et al. ......... 219/10.81

FOREIGN PATENT DOCUMENTS 415547  3/1989  Sweden .

Primary Examiner—Jay H. Woo
Assistant Examiner—Khanh P. Nguyen
Attorney, Agent, or Firm—Burns, Doane, Swecker & Mathis

[57] ABSTRACT

The invention includes an arrangement for manufacturing an elongated object (4) including, inter alia, a fibrous material, by compressing (7,8) a quantity of fibrous material provided with a binding agent and drying the compressed fibrous material by passing the material between the electrodes of a high-frequency drier (5). One electrode (12), preferably both electrodes (12, 13) of the drier is/are arranged to co-act with an electrode-heating device (16).

6 Claims, 1 Drawing Sheet

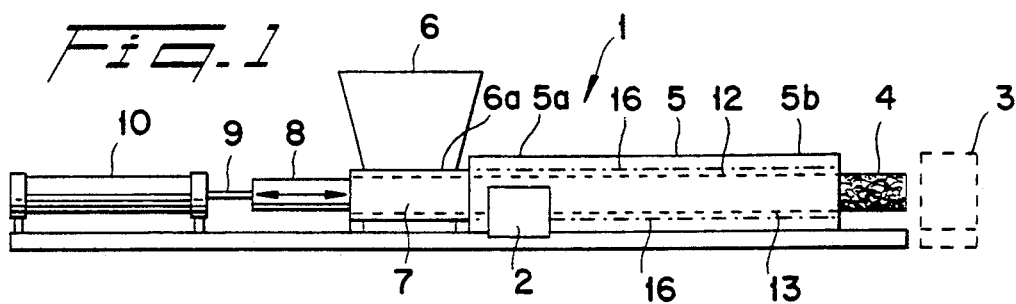
Fig. 1
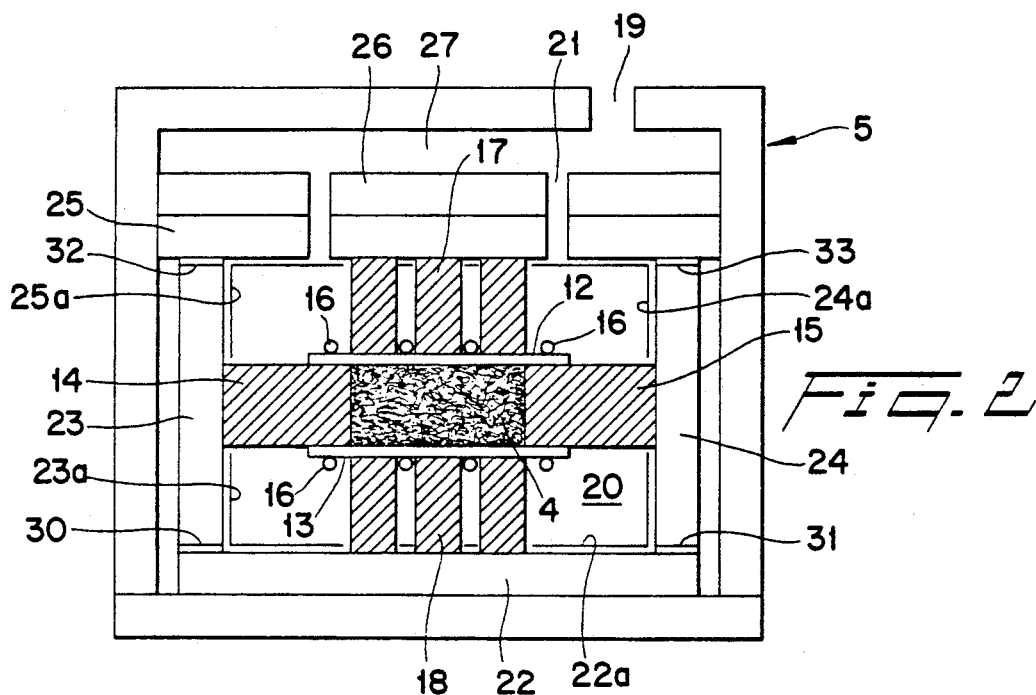
Fig. 2
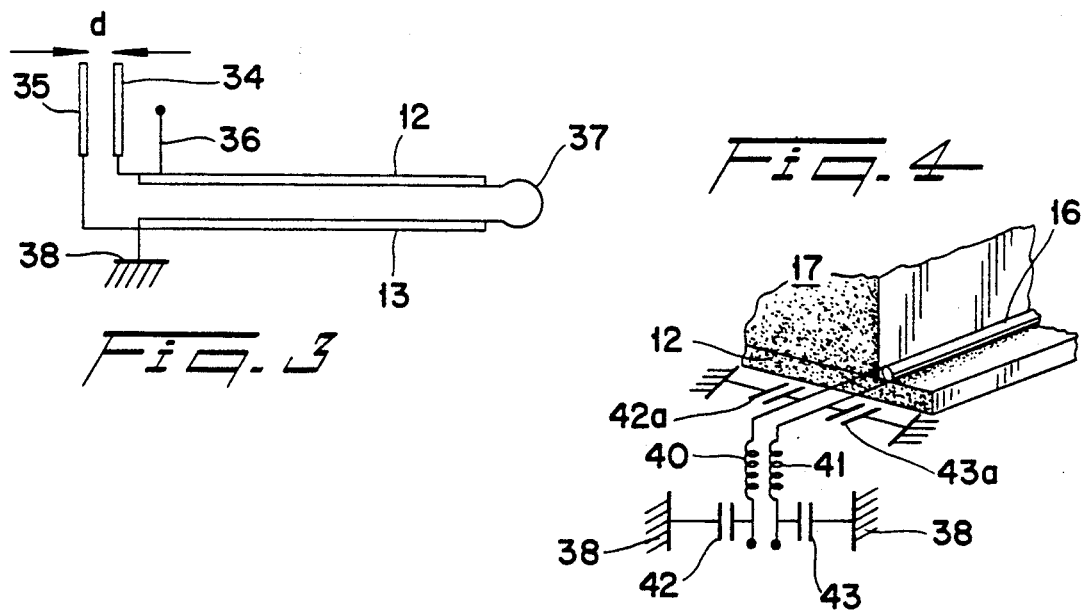
Fig. 3
Fig. 4

APPARATUS FOR PRODUCING AN ELONGATED FIBROUS OBJECT

BACKGROUND OF THE INVENTION

1. Field of the Invention

The present invention relates to an arrangement for producing an elongated object which is comprised, inter alia, of a fibrous material, and relates more specifically, although not exclusively, to an arrangement of the kind in which the elongated fiber-containing object is produced by compressing a quantity of fibrous material provided with a moist binder and drying the compressed fibrous material/binder mixture, by passing said mixture between the electrodes of a drier which is active at high frequencies.

2. Description of the Related Art

Swedish Patent Specification published under publication number 415 547 teaches an arrangement for producing an elongated object or product, in which fibre (or fiber) material provided with a binder is compressed, by feeding a proportion of the total amount of fibre material for the whole object to a compression chamber provided with compressing means. The compressing means is then activated so as first to compress said proportion of fibre material and then push said material into a matrix. The compression means is then withdrawn from the compression chamber so that a further proportion of fibre material can be delivered thereto and compressed and displaced by the compressing means.

According to the above mentioned Swedish patent specification, the matrix shall include a plurality of wall sections and at least one of those wall sections shall be arranged for movement relative to the object, with said relative movement being directed in the direction of the longitudinal axis of the object or in the production direction.

The U.S. Pat. No. 4,673,345 teaches the use of a heating arrangement in the form of a high frequency drier with an arrangement of the kind taught by the aforesaid Swedish patent specification.

SUMMARY OF THE INVENTION

Technical Problems

When considering the present state of the art as described above it will be realized that when the heating arrangement comprises a high-frequency drier, a technical problem as to how to avoid or at least substantially prevent, the precipitation of condensation on cold surfaces, particularly when starting up the drier. Such condensation impairs the working of the drier and is also likely to render the drier components defective.

When considering the above technical problem, it will be seen that a further technical problem resides in realizing that said problem can be solved by preheating the electrodes.

Another technical problem is one of realizing that a heating arrangement which is used to preheat the electrodes can also be used to impart smoother surfaces to the finished product.

It will also be seen that a technical problem resides in the provision of an electrically operated, electrode-heating device in a high-frequency active drier while reducing the effect from the generation of voltage in the drier as a result of the electrical conductors serving the heating arrangement and located in the electromagnetic field.

Another technical problem is one of providing means for removing by suction air laden with water vapour (or vapor) from a cavity enclosed by the electrodes and a cavity surrounding the electrodes, in such a way that while enabling moisture containing air to be removed from said cavities the electrodes will not be cooled to an undesirable extent in the process. This implies that the quantity of water vapour removed by suction shall be adapted to the water vapour (steam) generated at that moment in time.

A further technical problem is one of being able to arrange a plurality of heating devices in the immediate vicinity of the electrodes while, at the same time, enabling the electrodes to be supported against an insulating glass composite material.

When using a composite glass material, which is intended to support the electrodes and to form two mutually opposing matrix walls, it will be seen that there is a technical problem in providing for suitable displacement of the matrix walls and the electrode within the drier relative to the material produced, such that said displacement is made in response to the movement of a piston or plunger intended for compression of the binder-containing fibrous material.

A further technical problem is one of electromagnetically screening a high-frequency active drier which operates in conjunction with an arrangement for producing an elongated object or product conditions from the surroundings.

Solution

The present invention can be considered to be based on an arrangement for manufacturing an object comprised of, inter alia, a fibrous material, by compressing sequential quantities of fibre material containing a moist binder, and drying the compressed fibrous-material quantities by passing the same between the electrodes of a drier which is active at high frequencies, in accordance with the teachings of the aforesaid U.S. Patent Specification.

In accordance with the invention it is now proposed that one electrode, but preferably both electrodes, incorporated in the drier is/are arranged to co-act with an electrode-heating device. The electrode heating device is constructed to heat the electrode and elements located therearound to a temperature which will prevent condensation of the water present, prior to commencing the start of the object manufacturing process.

Furthermore, it is proposed that a facility is provided which will enable air laden with water vapour to be removed by suction from a cavity or space which is partly enclosed by the electrodes and which partly surrounds the electrodes.

The volume of air removed per unit of time is preferably adapted to or substantially adapted to the amount of water vapour generated in the drier.

When the electrode-heating device is powered by electrical energy, the energy is supplied over an inductance.

In accordance with one embodiment, a plurality of heating devices are positioned between electrically insulating glass composite material and in the immediate vicinity of the electrode.

The electrical energy for powering the heating device is supplied to the one electrode, namely the electrode which is connected to earth in the system.

The provision of an electrode-heating device will normally require a temperature-sensing thermostat on an electrode, and this sensing will also take place via an inductance.

In accordance with one exemplifying embodiment of the present invention, the use of a glass composite material, and particularly the use of a glass composite material to form side walls in the drier and to support the drier electrodes, is proposed. It is further proposed that the lower electrode shall be arranged to accompany the movement of a plunger or piston intended for compression of a quantity of binder-containing fibrous material. The two adjacent side walls comprising electrically insulating material are arranged to be displaced linearly in a manner to generate sufficient friction to join said quantities.

For the purpose of screening the high frequency drier, it is proposed that the electrodes and the glass composite material have spaced therearound an electrically conductive layer which is effective in screening the high-frequency electro-magnetic field.

In this regard, it is proposed that first rods made of glass composite material are arranged along two mutually opposite sides for abutment with the compressed quantities of fibrous material, and that a plurality of second rods made of glass composite material are arranged for supporting abutment with the electrodes along two mutually opposite sides.

Advantages

Those advantages primarily associated with an arrangement constructed in accordance with the present invention reside in the having at least one electrode heated prior to starting the process for manufacturing the elongated object, so that said process can be commenced without water vapour condensing on the high-frequency drier electrodes or in the vicinity thereof.

BRIEF DESCRIPTION OF THE DRAWINGS

The present invention will now be described in more detail with reference to the accompanying drawings, in which FIG. 1 is a side view, highly simplified, showing the principle construction of an arrangement according to the present invention for manufacturing an elongated object;

FIG. 2 is a sectional view of a preferred high-frequency drier used in the arrangement of FIG. 1;

FIG. 3 illustrates a simplified technical coupling arrangement for the electrodes incorporated in a high-frequency drier, to permit adaptation of the power emission; and FIG. 4 illustrates a simplified coupling circuit for supplying electrical energy to an electrode-heating device.

DESCRIPTION OF PREFERRED EMBODIMENTS

FIG. 1 is a highly simplified side view of an arrangement 1 for manufacturing an elongated object 4 in accordance with the present invention.

The arrangement illustrated in FIG. 1 includes a hydraulic piston-cylinder device 10, with associated piston and piston rod 9. The piston rod is reciprocatingly movable and co-acts with a compressing device 8, which has the form of a plunger and extends somewhat into a compression chamber 7 and forms a rear wall part thereof.

In addition to said rear wall part, the compression chamber 7 is also defined by a bottom part and two side parts, and also by the latest compressed quantity of fibrous material.

Arranged immediately above the compression chamber 7 is a device (or feeder) 6. The upper part of the device 6 may be configured with a space for receiving fibrous material and a space for receiving moist binding agent. The fibrous material and binding agent are mixed into portions of pre-determined size and moisture content in a mixing station not shown, whereafter the resultant proportions are fed to a lower space 6a of the device 6. A proportion, or quantity, of the total fibre material required for the whole of the object 4 is dispensed to the compression chamber 7 from the aforesaid lower space, with the aid of dispensing or portioning devices not shown.

A particularly suitable alternative, however, is to use a ready mixture of fibrous material and moist binder, and to supply this ready mix directly to the device 6. The proportion or quantity is measured by a weighing device and a compression plunger or filling plunger presses a weighed quantity of said mix into the compression chamber 7 which forms therewith the upper part of the compression chamber 7.

As will be understood, as an alternative to using a fibre suspension which is mixed with a binding agent, the elongated object can be formed by spraying or moistening a fibrous material with binding agent, in which case, and particularly in the latter case, the material is fed directly to the compression chamber 7 and there subjected to pressure.

The fibrous material may comprise cutter shavings, paper waste, plastics materials, sawdust and like materials.

The compressing device 8, which has the form of a plunger, is moved reciprocatingly by the aforesaid hydraulic piston-cylinder device 10, with associated piston and piston rod 9. In FIG. 1 the compressing device 8 is shown in a side view, in a non-compressing position and therewith withdrawn from the compression chamber. When the compressing device occupies its illustrated position, the space located in front of the compressing device is filled with fibre material from the device 6. This feed of material from said device can be effected by causing the compressing device 8 to expose an opening upon movement of said compressing device to the position shown in FIG. 1, thereby ensuring that the space or compression chamber thus formed can be filled with the aid of a further plunger, not shown in the Figure. When the compressing device 8 is displaced linearly to the right in FIG. 1, the fibre material or fibre-material quantity located in the compression chamber will be compressed against the preceding quantity of material, which has previously been compressed, so as to build-on a further quantity of material in the production of the complete object 4.

During this described displacement of the compressing means 8, the filling or charging plunger is in its lower position.

Thus, sequential proportions or quantities of material will be compressed in the compression chamber 7 and displaced in the form of an integral unit to a heating section, via a matrix. There is nothing to prevent this heating section from also including the compression chamber 7, particularly when the heating section utilizes a drier which is active at high frequency, therefore. In that case it is only necessary for the electrodes to be allowed to pass the compression chamber 7 and to provide in the upper electrode an aperture which will accommodate the charging or filling plunger used to introduce a further, weighed quantity of fibre material into the compression chamber 7.

The compressed fibre material, supplied with moist binder, is now introduced into the heating section and there treated with heat by means of a high-frequency heating device, whereafter the dried elongated object 4 can be discharged through a part 5b. The finished object is referenced 4.

The object 4 may also conceivably be transferred directly to a treatment plant 3, in which the outer surfaces of the object are treated with an impregnating liquid, or coated with paint, varnish or the like.

The arrangement illustrated in FIG. 1 also includes a control means 2 which controls the times at which reciprocating movement of the compressing device 8 is initiated. The control means also controls material and binding agent and the device proportioning the volumes of individual quantities of material. Controls means 2 also controls the device 6 containing the fibre material and pressing means associated with said device, together with other operational functions of the arrangement 1. The specific electric circuitry of the control means 2 has not been illustrated, since the construction of said control means will be readily apparent from the following functional description.

According to the present invention, the control means 2 also includes requisite electrical circuits for operating a dryer which is active at high frequencies.

FIG. 2 is a sectional view of a high-frequency dryer 5 constructed in accordance with the present invention.

FIG. 2 illustrates the orientation of the elongated binder-containing fibrous object 4 as it passes through a matrix, the upper surface of which is formed by the one electrode 12 of the high-frequency system, whereas the lower surface is formed by the second grounded electrode 13 of said high-frequency system.

The two side surfaces of the matrix are formed by two rods 14, 15 which comprise a glass composite material and which are fitted in between the electrodes 12, 13.

In accordance with the invention one electrode 12, although preferably both electrodes 12, 13, is arranged to co-act with one or more electrode-heating devices 16. The illustrated embodiment has four such devices 16 arranged to co-act with the upper electrode and four similar devices arranged to co-act with the lower electrode 13.

These electrode-heating devices are intended to heat, prior to initiating the manufacturing process, not only the electrodes 12, 13 but also elements peripheral of said electrodes, such as the rods 14, 15 and rods 17, 18, and also other elements, such as a top cover plate, to a temperature such as to avoid condensation of the water vapour generated onto cold surfaces.

It can be mentioned in this connection that water vapour is generated when drying the quantities of mixed fibre-binder materials at the very moment of starting up the drier. This water vapour normally rises and if it condenses on cold surfaces it is liable to cause electric discharges.

This is particularly applicable when the electrode and the electrode surroundings are not earthed (or grounded) in the system.

It is also proposed that air laden with water vapour is removed through a pipe 19 from a space enclosed by the electrodes 12, 13 and the rods 14 and 15, and also from a space 20 which surrounds the electrodes. The space 20 communicates with the pipe 19 via openings 21.

The volume of air thus extracted is preferably adapted, with the aid of a fan means not shown, such that said air volume per unit of time is commensurate with or essentially commensurate with the amount of water vapour generated in the drier.

It should be noted in particular that if the volume of air withdrawn by suction is set to exceed the volume of water vapour generated, only an insignificant amount of air will be able to pass in through the infeed side 5a, so that no wall portions will be cooled.

Air which passes in through the outfeed side 5b will also have a cooling effect and should be avoided.

In order to ensure that sufficient heat is obtained on the infeed side 5a, hot air may be directed onto the compression chamber 7 and elements located therein. In this case, the volume of air extracted by suction should be increased, so that the hot air will pass into the matrix and around said matrix and the electrodes.

It is also proposed in accordance with the present invention that the lower grounded electrode or the lower electrode 13 is firmly connected, via electrically insulating glass composite rods 18, to a bottom plate 22 which is joined to the plunger 8 and thus moves together with said plunger.

The glass composite rod 14 is firmly connected to a plate 23 and the glass composite rod 15 is connected firmly to a plate 24, which are arranged to be displaced linearly by hydraulic piston-cylinder devices (not shown) corresponding to the piston-cylinder device 9, 10. The upper electrode 12 is connected firmly to a plate 25 via rods 17 which comprise a similar glass composite material.

The plates 22, 23, 24 and 25 are made of an electrically conductive material.

Located above the upper plate 25 is a heat insulating material 26, while located above said material 26 is a space 27 through which air laden with water vapour is conducted to a pipe or outlet 19 and from there away from the system.

The inner surfaces of the plates or elements 22, 23, 24 and 25 are coated with copper layers 22a, 23a, 24a, and 25a which are intended for screening the electromagnetic field. Since a given degree of relative movement will take place between the element 22 and the elements 23 and 24, and between the elements 23 and 24 and the element 25, copper rails 30, 31 are arranged between said elements 22, 23 and 24 respectively, while copper rails 32, 33 are arranged between the element 25 and the elements 23 and 24.

The aforesaid glass composite material comprises a material retailed under the trade mark "ARCLEX".

FIG. 3 illustrates a connection 36 for supplying energy to the high-frequency dryer. The connection 36 is connected to the upper electrode 12 which is connected through a connection 37 to the bottom electrode 13, which in turn is connected by an electrical conductor to system earth 38.

The electrodes 12 and 13 are also connected electrically to a respective plate 34 and 35 of a capacitor, the capacitance of which can be varied by altering the distance "d" between said plates.

This variation in distance "d" can best be effected by mounting the plate 34 for movement along a guide, towards and away from the plate 35.

This possibility of adjusting the aforesaid distance "d" enables the high-frequency circuit to be tuned to pre-selected operating conditions.

In the case of certain applications it may be necessary to adapt the system in a manner which is not contingent on the plate 34 and 35, but which requires the use of different lengths of the connection 37.

It is possible with the aid of solely one, or with the aid of both adapting possibilities to change and move the voltage distribution, and therewith the drying effect along individual length sections of the electrode 12 and 13.

FIG. 4 illustrates one example of a circuit for the supply of electrical energy to the heating device 16, said supply being effected over an inductance 40, 41 and with four capacitances 42 and 42a, 43 and 43a connected to system earth (or ground) 38 for the high-frequency system. This circuit, or coupling, is intended to reduce the generation of voltage occurring in the device 16 as a result of the high-frequency circuit and of the cable connections. The capacitances are intended to dampen induced voltage peaks.

As will be seen from FIG. 2, at least four, heating devices 16 are arranged between electrically insulating, glass composite materials 17, each of said devices being supplied with energy through a FIG. 4 circuit.

The supply of electrical energy to the device 16 located adjacent the bottom electrode 13 can be effected directly to said electrode, without passing through the FIG. 4 circuit, since the electrode 13 is connected to system earth 38. In the case of the illustrated embodiment, respective devices are surrounded by a screening tube which extends out of the electromagnetic field.

It should be noted, however, that in this case the device 16 shall be fully encompassed in a screening tube, a copper tube, which extends completely through the electromagnetic field.

Although not shown in the drawings, the arrangement includes a temperature sensing thermostat which is connected to the upper surface of the electrode 12 and which senses through an inductance and with the aid of a plurality of capacitances, in the manner indicated in FIG. 4.

As previously mentioned, the bottom electrode 13 shall move together with the plunger 8, by means of which a quantity of fibrous material provided with a moist binder is compressed, while the two side walls, made of an electrically insulating material, are moved simultaneously through approximately half of said movement.

The relative displacement between the stationary electrode 12 and the side walls 14, 15, and the relative displacement between the movable electrode 13 and the side walls is adapted so that there is generated thereby sufficient friction to join the separate fibre quantities together and to impart a smooth surface to said quantities.

It will also be seen from FIG. 2 that the first rods 14, 15 of glass composite material are arranged to abut the compressed quantities along two mutually opposite sides of the object 4, and that one or more second rods 17, 18 made of glass composite material are arranged to supportingly abut the electrodes 12, 13 along two mutually opposite sides.

The electrodes and rods extend from the compression chamber 7 to said end part 5b.

Although the compression chamber 7 of the illustrated exemplifying embodiment is located within the dryer 5, the upper electrode 12 being provided with an aperture through which the fibre-binder mixture can be passed, it also lies within the scope of the invention to provide a compression chamber which is separate to and spaced from the dryer. This latter alternative can be expected to afford somewhat simpler measures in respect of the drier.

It will be understood that the invention is not restricted to the illustrated and described embodiment, since modifications can be carried out within the scope of the invention defined in the following claims.

I claim:

1. An apparatus for drying an elongated fibrous object, comprising:
   a drying chamber;
   two electrodes mounted inside the drying chamber, said electrodes being arranged substantially parallel to each other and separated by a space for containing and drying the fibrous object;
   two electrically insulating rods, arranged between the electrodes with one rod on each side of the space, for compressing two sides of the fibrous object; and
   means for raising a temperature of at least one of the electrodes to a temperature at which vapors produced by drying the fibrous object will not condense on said one electrode;
   wherein said temperature raising means also raises the temperature of every surface inside said drying chamber to a temperature at which vapors produced by drying said fibrous object will not condense on any surface inside said drying chamber.

2. An apparatus as claimed in claim 1, further comprising means for removing vapors from said drying chamber.

3. An apparatus as claimed in claim 2, wherein said vapor removing means removes a volume of fluid from said heating chamber which is substantially the same as a volume of vapor produced by drying said elongated fibrous object inside the chamber.

4. An apparatus as claimed in claim 1, wherein said temperature raising means is powered through a coupling circuit.

5. An apparatus as claimed in claim 1, wherein said temperature raising means is controlled by a thermostat.

6. An apparatus as claimed in claim 1, wherein said drying chamber further comprises means for preventing electromagnetic radiation produced by said electrodes from escaping from the drying chamber.

* * * * *